(12) United States Patent
Chen

(10) Patent No.: US 7,406,338 B2
(45) Date of Patent: Jul. 29, 2008

(54) DUAL DISPLAY MODULE

(75) Inventor: Hung-Chih Chen, Dadu Township Taichung County (TW)

(73) Assignee: Au Optronics corporation, Hsinchu (TW)

( * ) Notice: Subject to any disclaimer, the term of this patent is extended or adjusted under 35 U.S.C. 154(b) by 555 days.

(21) Appl. No.: 10/818,977

(22) Filed: Apr. 5, 2004

(65) Prior Publication Data

US 2005/0197165 A1      Sep. 8, 2005

(30) Foreign Application Priority Data

Mar. 1, 2004      (TW) ............................... 93105258 A

(51) Int. Cl.
    *H04B 1/38*      (2006.01)
(52) U.S. Cl. ................. 455/566; 455/575.1; 455/550.1; 455/90.3
(58) Field of Classification Search ........... 455/566, 455/575.1, 550.1, 90.3, 95, 567, 414.4, 575.3, 455/425; 345/1.1, 502; 349/58
    See application file for complete search history.

(56) References Cited

U.S. PATENT DOCUMENTS

| | | | | |
|---|---|---|---|---|
| 4,772,100 A | * | 9/1988 | Suenaga ..................... 349/58 |
| 5,133,670 A | * | 7/1992 | Doi et al. ..................... 439/79 |
| 5,274,570 A | * | 12/1993 | Izumi et al. ..................... 716/1 |
| 6,350,133 B2 | * | 2/2002 | Christensen et al. .......... 439/66 |
| 6,583,770 B1 | * | 6/2003 | Antila et al. ................. 345/1.1 |
| 2002/0016182 A1 | * | 2/2002 | Kubo et al. ................. 455/550 |
| 2002/0022503 A1 | * | 2/2002 | Lee ............................ 455/566 |
| 2002/0107055 A1 | * | 8/2002 | Yamazaki et al. ........... 455/575 |
| 2002/0183099 A1 | * | 12/2002 | Lee ............................ 455/566 |
| 2003/0063041 A1 | * | 4/2003 | Kurashima et al. ........... 345/1.1 |
| 2004/0021616 A1 | * | 2/2004 | Goto et al. .................... 345/1.1 |
| 2004/0132491 A1 | * | 7/2004 | Kim et al. ................. 455/556.1 |
| 2004/0183745 A1 | * | 9/2004 | Choi .......................... 345/1.1 |
| 2004/0259599 A1 | * | 12/2004 | Okawa ....................... 455/567 |
| 2005/0040753 A1 | * | 2/2005 | Osame et al. ............... 313/500 |
| 2005/0190191 A1 | * | 9/2005 | Turner et al. ................. 345/502 |
| 2005/0253773 A1 | * | 11/2005 | Sekiguchi .................... 345/1.1 |
| 2006/0132425 A1 | * | 6/2006 | Kim et al. .................... 345/104 |
| 2007/0109215 A1 | * | 5/2007 | Goto et al. ................... 345/1.1 |
| 2007/0120811 A1 | * | 5/2007 | Kudo et al. ................. 345/103 |

* cited by examiner

*Primary Examiner*—Tan Trinh
(74) *Attorney, Agent, or Firm*—J.C. Patents

(57) ABSTRACT

A dual display module is provided. The dual display module comprises a common circuit board, a first display panel and a second display panel. The common circuit board has a first surface and a second surface. The first display panel and the second display panel are respectively set up on the first surface and the second surface. At least one of the display panels is directly attached to the common circuit board through a connecting interface. The dual display module has a lower manufacturing cost and provides a better yield.

21 Claims, 3 Drawing Sheets

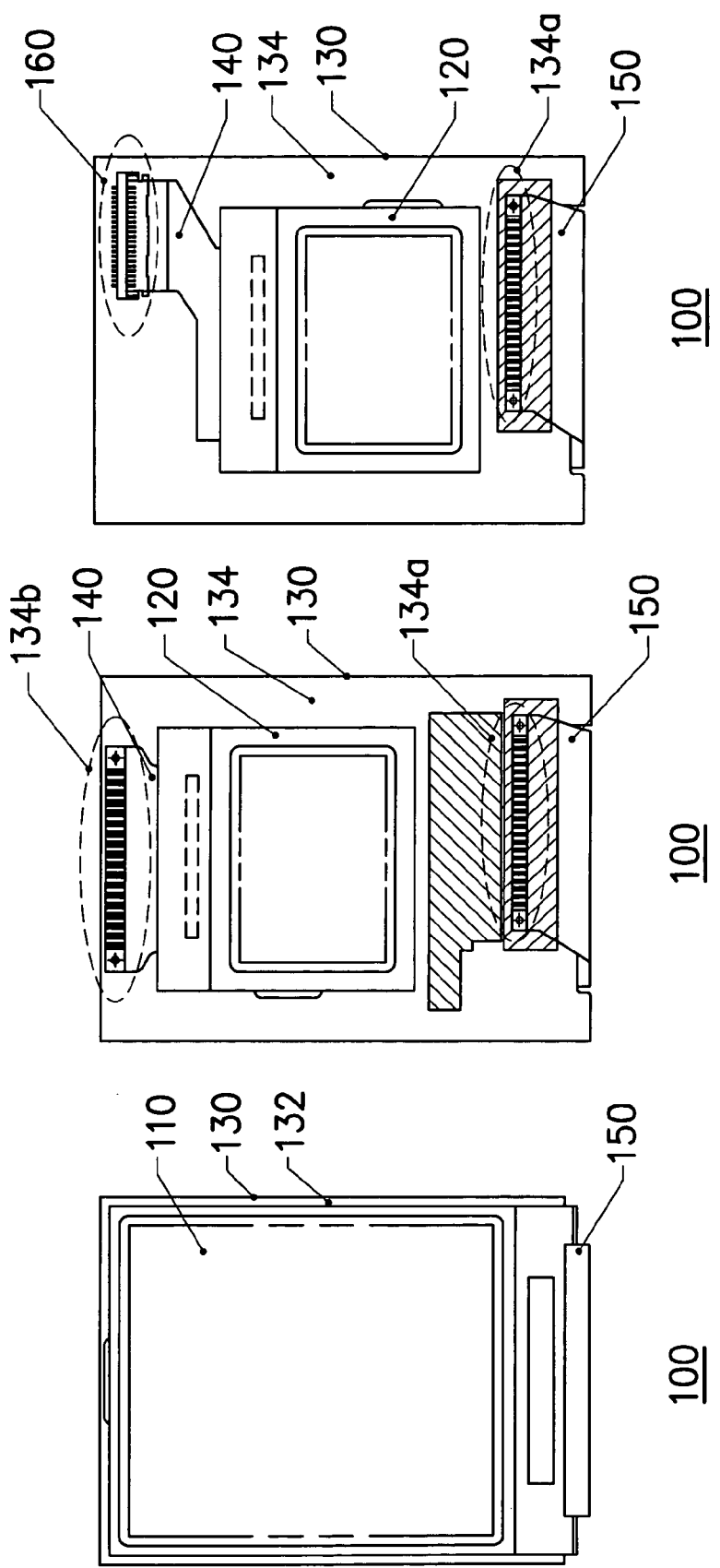

DUAL DISPLAY MODULE

CROSS-REFERENCE TO RELATED APPLICATION

This application claims the priority benefit of Taiwan application serial no. 93105258, filed on Mar. 1, 2004.

BACKGROUND OF THE INVENTION

1. Field of the Invention

The present invention relates to a display module. More particularly, the present invention relates to a dual display module having a lower manufacturing cost and a better yield.

2. Description of Related Art

In this information-based society, our dependence on portable electronic products increases every day. Electronic products such as mobile phones, notebook computers, personal digital assistants (PDA) can be seen everywhere. As electronic technologies continue to progress, many types of multi-functional and personalized portable electronic products have been developed. For example, many types of mobile phones can be found in the market. Aside from the vertical type of mobile phones with an operating interface (keypad) on the same side as the display screen, other types of mobile phones include the one whose operating interface (keypad) and the display screen can be folded together. In general, the foldable type of the mobile phones has a larger display area and occupies a smaller space than a conventional vertical type phone. Recently, a foldable mobile phone with dual display screens is out in the market. Besides the main display screen, a smaller secondary display screen is set up on the surface of the front panel backing on the main display screen. The secondary display screen mainly serves to indicate time or incoming calls.

FIGS. 1A and 1B are schematic views showing the front and the back of a dual display module of a conventional mobile phone. The dual display module 100 comprises a first display panel 110, a second display panel 120, a first circuit board 130 and a second circuit board 140. Furthermore, the first display panel 110 has a size larger than the second display panel 120. The first circuit board 130 has a first surface 132 and a second surface 134. The first display panel 110 is set up on the first surface 132 of the first circuit board 130 and connected to the first circuit board 130 through a flexible circuit board 150. One end of the flexible circuit board is connected to the peripheral circuit of the first display panel 110. The other end of the flexible circuit board wraps around the side of the first circuit board 130 and presses against a first connection interface 134a on the second surface 134 of the first circuit board 130 to form a bond by anisotropic conductive paste (ACP).

As shown in FIG. 1B, the second display panel 120 is set up on the second surface 134 of the first circuit board 130 and electrically connected to the second connection interface 134b of the first circuit board 130 through the second circuit board 140. The second circuit board 140 is a flexible circuit board and electrically connected with the first circuit board 130 in a pressing manner by anisotropic conductive paste. In the aforementioned process, the first display panel 110 and the first circuit board 130 are first pressed together. Similarly, the second display panel 120 and the second circuit board 140 are electrically connected by a press fit process. Finally, the first circuit board 130 and the second circuit board 140 are pressed together. In other words, altogether three separate pressing processes are required to fabricate the dual display module.

The second circuit board 140 and the first circuit board 130 can be electrically connected using some other methods too. Referring to FIG. 1C, a back view of another dual display module of a conventional mobile phone is shown. The second circuit board 140 is assembled to the first circuit board 130 through a connector 160. Hence, the fabrication of the dual display module 100 involved two press-fit processes and an assembly process only. Although assembly using a connector 160 costs more than connection in a direct press-fit manner, yet a single slot in the connector 160 may simultaneously link up with a plurality of leads. Hence, further expansion or alteration is permitted in the presence of the connector 160. In addition, the manner by assembling further aids subsequent product repair.

However, because the aforementioned dual display modules demands the first display panel and the second display panel assembled through the first circuit board and the second circuit board respectively, the production cost regardless whether a flexible circuit board or a connector is employed. Moreover, the conventional dual display module has to be assembled in at least three steps. When the number of processing steps is increased, not only fabrication time is prolonged but more assembling errors are also occur. Eventually, the productivity and assembling yield of the dual display module will drop.

SUMMARY OF THE INVENTION

Accordingly, the present invention is directed to a dual display module, which can be manufactured at a lower cost, and with shorter production cycle and a better yield.

According to an embodiment of the present invention, a dual display module is provided. The dual display module comprises at least a common circuit board, a first display panel and a second display panel. The first display panel can be larger or smaller than the second display panel. The common circuit board has a first surface and a second surface. Furthermore, the common circuit board has a connection interface. The connection interface is set up on the second surface. In addition, the first display panel is set up on the first surface of the common circuit board and electrically connected to the common circuit board. The second display panel is set up on the second surface of the common circuit board and electrically connected to the common circuit board through the connection interface.

In the aforementioned dual display module, the common circuit board is a flexible circuit board, a rigid circuit board, or a combination thereof. The first display panel and the second display panels are liquid crystal display panels, light-emitting diode panels or organic electroluminescence (OEL) display panels. In addition, the connection interface is electrically connected to the second display panel through a connector. Alternatively, the connection interface is electrically connected to the second display panel by using an anisotropic conductive film or an anisotropic conductive paste.

According to another embodiment of the present invention, the dual display module comprises a common circuit board, a first display panel and a second display panel. The first display panel has a size greater or smaller than the second display panel. The common circuit board has a first surface and a second surface. Furthermore, the common circuit board has a first connection interface and a second connection interface. The first connection interface is set up on the first surface and the second connection interface is set up on the second surface. In addition, the first display panel is set up on the first surface of the common circuit board and electrically connected to the common circuit board through the first connection interface. The second display panel is set up on the second surface of the common circuit board and electrically connected to the common circuit board through the second connection interface.

In the aforementioned dual display module, the common circuit board is a flexible circuit board, a rigid circuit board, or a combination thereof. The first display panel and the second display panels are liquid crystal display panels, light-emitting diode panels or organic electroluminescence (OEL) display panels. The first connection interface and the second connection interface are electrically connected to the first display panel and the second display panel respectively through a connector. Alternatively, the first connection interface and the second connection interface are electrically connected to the first display panel and the second display panel respectively by using an anisotropic conductive film or an anisotropic conductive paste.

Accordingly, the dual display module of the present invention utilizes at least one of the surface of the common circuit board to set up a connection interface. The first display panel (or the second display panel) may press against the connection interface through a layer of anisotropic conductive paste or an anisotropic conductive film so that the first display panel (or the second display panel) is electrically connected to the common circuit board. In this way, the dual display module of the present invention can save the cost of a flexible circuit board and the time for performing the pressing process so that the production cycle is shortened and the product yield is increased.

It should be noted that the aforementioned connection interface can be a connector if cost is not a major consideration. If a connection is used, there is no need to use the anisotropic conductive paste or the anisotropic conductive film as a conductive medium in the pressing process. The first display panel and the second display panel can be electrically connected to the common circuit board in an assembling process instead.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The following drawings illustrate embodiments of the invention and, together with the description, serve to explain the principles of the invention.

FIG. 1A is a front view of a dual display module of a conventional mobile phone.

FIG. 1B is a back view of a dual display module of a conventional mobile phone.

FIG. 1C is a back view of a dual display module of another conventional mobile phone.

DESCRIPTION OF THE EMBODIMENTS

Figure 2B:
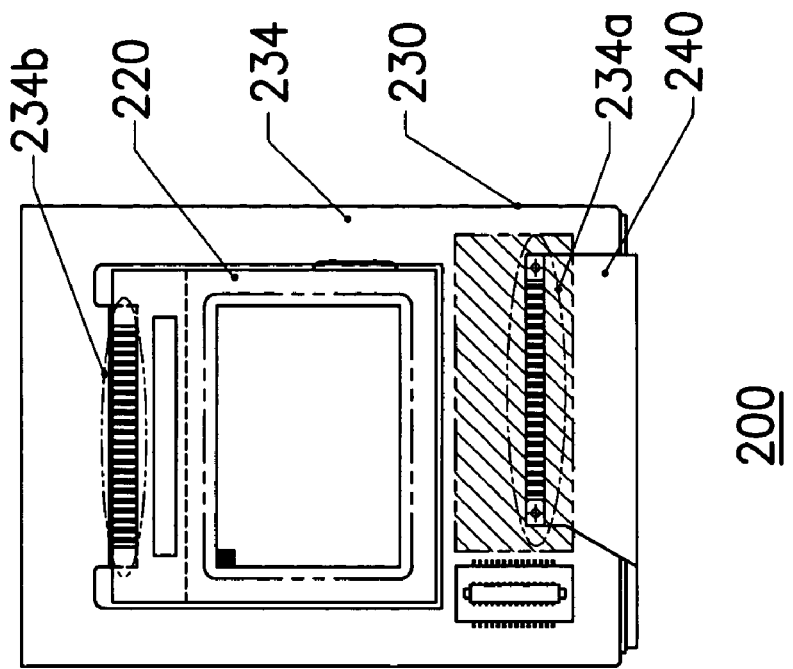
FIG. 2B is a back view of a dual display module of a mobile phone according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
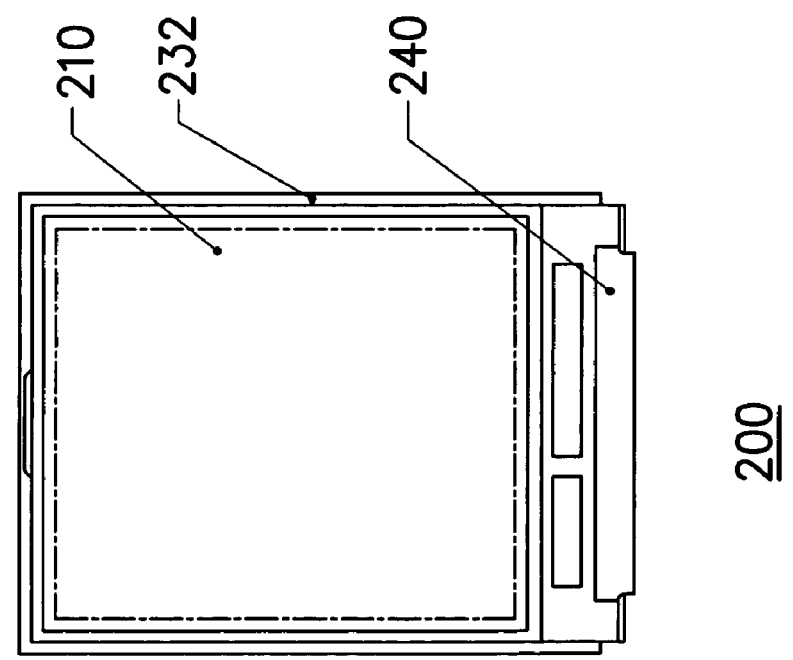
FIG. 2A is a front view of a dual display module of a mobile phone according to one embodiment of the present invention.

FIGS. 2A and 2B are the front view and the back view of a mobile phone with a dual display module design according to one embodiment of the present invention. As shown in FIGS. 2A and 2B, the dual display module 200 comprises a first display panel 210, a second display panel 220 and a common circuit board 230. The first display panel 210 has a size greater than the second display panel 220. The common circuit board 230 is a flexible circuit board, a rigid circuit board, or a combination thereof, for example. Furthermore, the common circuit board 230 has a first surface 232 and a second surface 234. A first connection interfaces 234a and a second connection interface 234b are set up on the second surface 234 of the common circuit board 230.

The first display panel 210 and the second display panel 220 can be liquid crystal display panels, light-emitting diode panels, organic electroluminescence display panels or some other type of panels. Furthermore, the first display panel 210 is set up on the first surface 232 of the common circuit board 230 and electrically connected to the first connection interface 234a on the second surface 234 through the flexible circuit board 240. The flexible circuit board 240 is electrically connected to the first connection interface 234a by pressing each other using a bonding medium such as anisotropic conductive paste (or an anisotropic conductive film).

As shown in FIG. 2B, the second display panel 220 is set up on the second surface 234 of the common circuit board 230 and electrically connected to the common circuit board 230 through the second connection interface 234b. Similarly, the second display panel 220 is electrically connected to the second connection interface 234b by pressing each other using a bonding medium such as anisotropic conductive paste (or an anisotropic conductive film).

In the aforementioned dual display module, the conventional method of using a flexible circuit board 240 to connect the first display panel 210 with the common circuit board 230 is applied. However, the second display panel 220 is directly pressed on the common circuit board 230 through the second connection interface 234b. Compared to the conventional method, the dual display module according to the present invention does not require a flexible circuit board to carry the second display panel and hence the process of pressing the second display panel to the flexible circuit board can be skipped. In other words, only two pressing processes need to be carried out. Thus, with the production method of forming the dual display module according to the present invention, the production cost is lowered and the product yield is increased.

It should be noted that the method of joining the first display panel and the second display panel dual in the fabrication of the dual display module can be interchanged. In other words, the first display panel is set up on the second surface of the common circuit board and the first display panel is directly pressed against the common circuit board through the first connection interface. Correspondingly, the second display panel is set up on the first surface and electrically connected to the second connection interface on the second surface through a flexible circuit board.

Figure 3B:
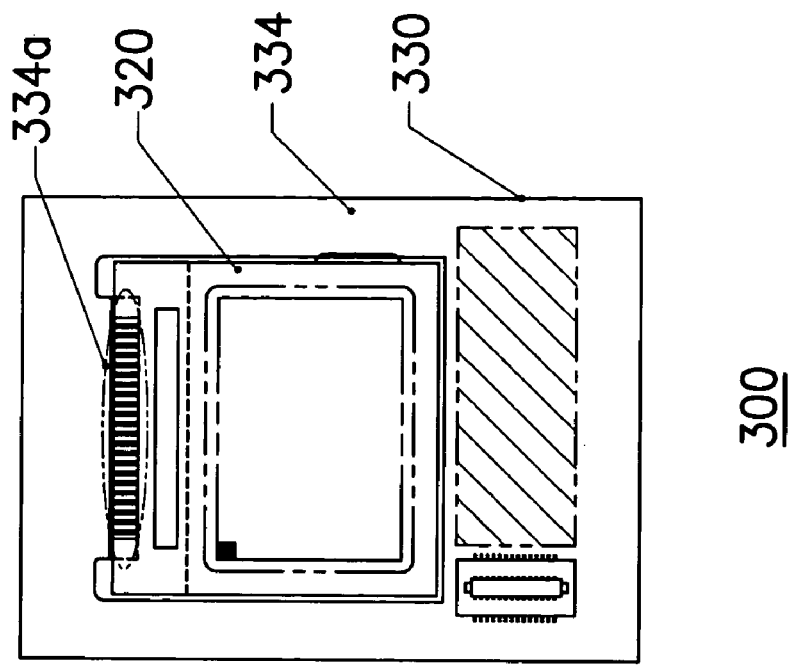
FIG. 3B is a back view of a dual display module of another mobile phone according to one embodiment of the present invention.
Figure 3A:
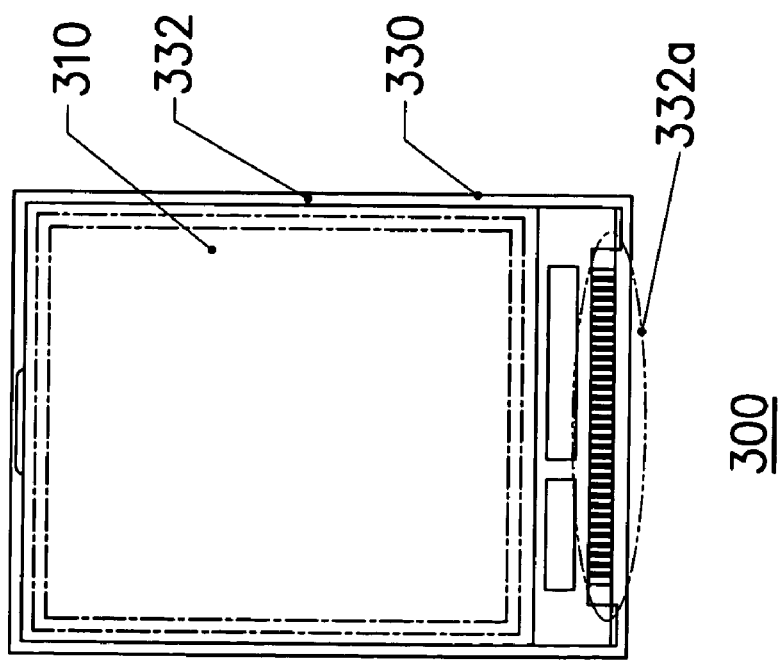
FIG. 3A is a front view of a dual display module of another mobile phone according to one embodiment of the present invention.

When the first connection interface and the second connection interface are respectively set up on the first surface and the second surface of the common circuit board, both the first display panel and the second display panel can be directly pressed on the common circuit board. There is no need to use any flexible circuit board to connect with the common circuit board. FIGS. 3A and 3B are front and back view of a dual display module of another mobile phone according to one embodiment of the present invention. In the following, only the assembling part of the first display panel 310, the second display panel 320 and the common circuit board 330 is described because other components and setups in the dual display module are similar to the one described in the first embodiment of the present invention.

As shown in FIG. 3A, the first display panel 310 is set up on a first surface 332 of a common circuit board 330. The first surface 332 has a first connection interface 332a. The first display panel 310 is directly pressed on the first connection interface 332a using some anisotropic conductive paste so that the first display panel 310 and the common circuit board 330 are electrically connected together. As shown in FIG. 3B, the second display panel 320 is set up on a second surface 334 of the common circuit board 330. The second surface 334 has a second connection interface 334a. Similarly, the second display panel 320 is directly pressed on the second connection interface 334a using an anisotropic conductive paste so that the second display panel 320 and the common circuit board 330 are electrically connected together.

In the aforementioned second embodiment of the present invention, the first display panel and the second display panel of the dual display module are directly pressed against the common circuit board. Hence, there is no need to use any flexible circuit board. In other words, the production cost of the dual display module can be lowered because material cost for the flexible circuit board as well as processing cost for joining the first display panel (or the second display panel) with the flexible circuit board are being saved.

In summary, the dual display module of the present invention has at least one of the display panels directly pressed against the connection interface on the common circuit board. The first display panel (or the second display panel) may be directly pressed against the common circuit board and attached to the common circuit board using an anisotropic conductive paste or an anisotropic conductive film as a conductive medium. In this way, production cost is reduced, production cycle is shortened and assembly yield is increased.

In addition, if production cost is not a major factor of consideration, the connection interface can be a connector so that the first display panel and the second display panel may be directly attached to the common circuit board in an assembly process. In this way, functional expansion of the dual display module is introduced and subsequent product repair is also facilitated. Although the dual display module design in a mobile phone is described all along, the present invention can be applied to other electronic products including personal digital assistants (PDA), palm top computers, and the like.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dual display module, comprising:
   a common circuit board, comprising a first surface, a second surface, a first connection interface and a second connection interface thereon, wherein the first connection interface and the second connection interface are located on the second surface;
   a first display panel, set up on the first surface of the common circuit board;
   a flexible circuit board, electrically connected between the first display panel and the first connection interface; and
   a second display panel, set up on the second surface of the common circuit board and electrically connected to the second connection interface, wherein the second display panel is pressed on the common circuit board through the second connection interface.

2. The dual display module of claim 1, wherein the common circuit board comprises a flexible circuit board, a rigid circuit board, or a combination thereof.

3. The dual display module of claim 1, wherein the first display panel comprises a liquid crystal display panel, a light-emitting diode panel or an organic electroluminescence display panel.

4. The dual display module of claim 1, wherein the second display panel comprises a liquid crystal display panel, a light-emitting diode panel or an organic electroluminescence display panel.

5. The dual display module of claim 1, wherein the first connection interface or the second connection interface comprises a connector.

6. The dual display module of claim 1, wherein the module further comprises an anisotropic conductive film, which is electrically connected between the second display panel and the connection interface.

7. The dual display module of claim 1, wherein the first display panel has a size greater than the second display panel.

8. The dual display module of claim 1, wherein the first display panel has a size smaller than the second display panel.

9. A dual display module, comprising:
   a common circuit board, comprising a first surface, a second surface, a first connection interface and a second connection interface thereon, wherein the first connection interface is located on the first surface and the second connection interface is located on the second surface;
   a first display panel, set up on the first surface of the common circuit board and electrically connected to the common circuit board through the first connection interface; a flexible circuit board, electrically connected between the first display panel and the first connection interface; and
   a second display panel, set up on the second surface of the common circuit board and electrically connected to the common circuit board through the second connection interface,
   wherein at least one of the first and the second display panel is pressed on the common circuit board through the corresponding first or second connection interface.

10. The dual display module of claim 9, wherein the common circuit board comprises a flexible circuit board, a rigid circuit board, or a combination thereof.

11. The dual display module of claim 9, wherein the first display panel comprises a liquid crystal display panel, a light-emitting diode panel or an organic electroluminescence display panel.

12. The dual display module of claim 9, wherein the second display panel comprises a liquid crystal display panel, a light-emitting diode panel or an organic electroluminescence display panel.

13. The dual display module of claim 9, wherein the first connection interface comprises a connector.

14. The dual display module of claim 9, wherein the second connection interface comprises a connector.

15. The dual display module of claim 9, wherein the module further comprises an anisotropic conductive film, which is electrically connected between the first display panel and the first connection interface.

16. The dual display module of claim 9, wherein the module further comprises an anisotropic conductive paste, which is electrically connected between the first display panel and the first connection interface.

17. The dual display module of claim 9, wherein the module further comprises an anisotropic conductive film, which is electrically connected between the second display panel and the second connection interface.

18. The dual display module of claim 9, wherein the module further comprises an anisotropic conductive paste, which is electrically connected between the second display panel and the second connection interface.

19. The dual display module of claim 9, wherein the first display panel has a size greater than the second display panel.

20. The dual display module of claim 9, wherein the first display panel has a size smaller than the second display panel.

21. The dual display module of claim 9, wherein the first display panel is pressed on the first surface of the common circuit board through the first connection interface and the second display panel is pressed on the second surface of the common circuit board through the second connection interface.

* * * * *